United States Patent
Ehlig et al.

(10) Patent No.: US 9,885,320 B2
(45) Date of Patent: Feb. 6, 2018

(54) PRESSURE REGULATOR

(71) Applicant: Parker-Hannifin Corporation, Cleveland, OH (US)

(72) Inventors: William Eric Ehlig, San Francisco, CA (US); Daniel Morgan, Vacaville, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/303,576

(22) PCT Filed: May 5, 2015

(86) PCT No.: PCT/US2015/029194
§ 371 (c)(1),
(2) Date: Oct. 12, 2016

(87) PCT Pub. No.: WO2015/171579
PCT Pub. Date: Nov. 12, 2015

(65) Prior Publication Data
US 2017/0159610 A1    Jun. 8, 2017

Related U.S. Application Data

(60) Provisional application No. 61/988,456, filed on May 5, 2014.

(51) Int. Cl.
*F16K 31/12*    (2006.01)
*F02M 21/02*    (2006.01)
(Continued)

(52) U.S. Cl.
CPC .......... *F02M 21/0239* (2013.01); *F01L 3/02* (2013.01); *F02M 21/0296* (2013.01);
(Continued)

(58) Field of Classification Search
CPC .......... F02M 21/0239; F02M 21/0296; F02M 21/0215; F01L 3/02; F16K 27/02;
(Continued)

(56) References Cited

U.S. PATENT DOCUMENTS 4,101,262 A * 7/1978 Neyret .................... F23Q 2/173
137/552
4,362,134 A * 12/1982 Worthen .................. F01L 3/02
123/188.3
(Continued)

FOREIGN PATENT DOCUMENTS

JP    S58 187819 U    12/1983

OTHER PUBLICATIONS

International Search Report and Written Opinion for corresponding Patent Application No. PCT/US2015/029194 dated Dec. 14, 2015.

*Primary Examiner* — Jessica Cahill
(74) *Attorney, Agent, or Firm* — Renner, Otto, Boisselle & Sklar, LLP

(57) ABSTRACT

A pressure regulator (10) including a body (12) having an internal chamber (110) and a thermal shield (124) made of a material having a lower thermal conductivity than a material of the body (12) for reducing heat transfer between the body (12) and the fluid flowing into the internal chamber (110). By reducing heat transfer between the fluid and the body (12), the temperature of the components of the pressure regulator (10) is increased to reduce failure of the components and the density of the fluid is increased to improve the flow capacity of the pressure regulator (10).

21 Claims, 5 Drawing Sheets

(51) Int. Cl.
     *G05D 16/10*    (2006.01)
     *F01L 3/02*     (2006.01)
     *F16K 27/02*    (2006.01)
     *F16K 49/00*    (2006.01)
(52) U.S. Cl.
     CPC .............. *F16K 27/02* (2013.01); *F16K 49/00* (2013.01); *G05D 16/10* (2013.01); *F02M 21/0215* (2013.01); *F17C 2205/0332* (2013.01); *Y02T 10/32* (2013.01)
(58) Field of Classification Search
     CPC . F16K 49/00; G05D 16/10; F17C 2205/0332; Y02T 10/37; Y10T 137/7796
     See application file for complete search history.

(56)  References Cited

U.S. PATENT DOCUMENTS

| | | |
|---|---|---|
| 5,443,083 A | 8/1995 | Gotthelf |
| 5,450,832 A | 9/1995 | Graf |
| 6,523,565 B2 | 2/2003 | Girouard |
| 6,619,269 B1* | 9/2003 | Stier ................ F02M 51/0671 123/467 |
| 6,986,350 B2 | 1/2006 | Zaiser et al. |
| 7,165,573 B2 | 1/2007 | Gotthelf |
| 2005/0092370 A1* | 5/2005 | Hilton .................... G05D 16/10 137/509 |
| 2016/0245422 A1* | 8/2016 | Ishii ...................... H01L 41/083 |

* cited by examiner

PRESSURE REGULATOR

RELATED APPLICATION DATA

This application is a national phase of International Application No. PCT/US2015/029194 filed May 5, 2015 and published in the English language, which claims priority to U.S. Provisional Application No. 61/988,456 filed May 5, 2014, which are hereby incorporated herein by reference in their entirety.

FIELD OF INVENTION

The present invention relates generally to pressure regulators, and more particularly to pressure regulators for compressed natural gas systems in vehicles.

BACKGROUND

Alternative fuels, such as compressed natural gas, may be used to power an internal combustion engine of a vehicle. Compressed natural gas may be stored in a tank on the vehicle at a high cylinder pressures, however the internal combustion engine cannot operate at such a high pressure. In order to regulate the pressure of the compressed natural gas in the tank to a relatively consistent pressure for delivery to the internal combustion engine, a pressure control regulator may be used. The pressure of the compressed natural gas may have a maximum inlet pressure of around 3600 psi, and a typical outlet pressure of around 120 psi. The pressure regulator may include one or more stages over which pressure is reduced, and the regulator may include springs, diaphragms and other components to balance pressures and fluid flow over the various stages of the pressure regulator.

SUMMARY OF INVENTION

The present invention provides a pressure regulator including a body having an internal chamber and a thermal shield made of a material having a lower thermal conductivity than a material of the body for reducing heat transfer between the body and the fluid flowing into the internal chamber. By reducing heat transfer between the fluid and the body, the temperature of the components of the pressure regulator is increased to reduce failure of the components and the density of the fluid is increased to improve the flow capacity of the pressure regulator.

According to one aspect of the invention, a pressure regulator is provided that includes a body having an inlet, an outlet, an internal chamber, a first fluid passage between the inlet and the internal chamber, and a second fluid passage between the internal chamber and the outlet, a valve seat surrounding the first fluid passage upstream of the internal chamber, a poppet movable relative to the valve seat from an open position to a closed position, and a thermal shield disposed within the internal chamber in the path of the fluid entering the internal chamber though the valve seat, the thermal shield being made of a material having a lower thermal conductivity than a material of the body for reducing heat transfer from the fluid flowing into the internal chamber to the body.

The pressure regulator may include a piston biasing the poppet in the open position.

The piston may be biased in a first axial direction towards the valve seat by one or more resilient members and movable in a second axial direction opposite the first direction by fluid acting on the piston.

The piston may be sealed to the valve body by one or more seals.

The thermal shield may have a lower thermal conductivity than the piston for reducing heat transfer to the fluid flowing into the internal chamber.

The thermal shield may be made from polytetrafluoroethylene.

The thermal shield may surround the poppet to axially guide the poppet.

The pressure regulator may further include a nozzle passageway downstream of the valve seat for directing fluid passing through the valve seat into the internal chamber.

The nozzle passageway may flare outward.

The nozzle passageway and the valve seat may be integrally formed.

The body may further include a relief port in fluidic communication with the internal chamber for receiving a relief valve.

The thermal shield may have an interior surface defining at least a portion of a wall of a passageway extending from the first flow passage to the second flow passage.

The wall may include first and second segments normal to one another for directing fluid to the second flow passage at a right angle.

The interior surface of the thermal shield may be curved for a smooth turning of the fluid.

The valve seat may be supported in the body for movement relative to the body for allowing the position of the valve seat to float relative to the body.

The valve seat may be resiliently biased downward in a first axial direction and movable upward in a second axial direction as a function of inlet pressure of fluid flowing through the first flow passage.

The valve seat may be movable in the second direction by increasing inlet pressure.

According to another aspect of the invention, a pressure regulator is provided that includes a body having an inlet, an outlet, and a flow passage extending therebetween, a valve seat supported in the body for movement relative to the body for allowing the position of the valve seat to float relative to the body, the valve seat being resiliently biased downward in a first direction and movable upward in a second direction as a function of inlet pressure of fluid flowing through the flow passage, and a poppet movable relative to the valve seat in the second direction from a first position to a second position.

The valve seat may be movable in the second direction by increasing inlet pressure to reduce pressure drop of fluid flowing through a nozzle passageway downstream of the valve seat.

The pressure regulator may further include a piston biasing the poppet in the first position.

The piston may be biased in the first direction by one or more resilient members and movable in the second direction by fluid acting on the piston.

Movement of the valve seat in the second direction may effect movement of the piston in the second direction.

The pressure regulator may further include a nozzle passageway downstream of the valve seat for directing fluid passing through the valve seat into the internal chamber.

The nozzle passageway may flare outward.

The nozzle passageway and the valve seat may be integrally formed.

The body may further include an internal chamber, and wherein the fluid passage includes a first fluid passage between the inlet and the internal chamber, and a second fluid passage between the internal chamber and the outlet.

The pressure regulator may further include a thermal shield disposed within the internal chamber in the path of the fluid entering the internal chamber though the valve seat.

The thermal shield may be made of a material having a lower thermal conductivity than the material of the body for reducing heat transfer between the fluid flowing into the internal chamber and the body.

The thermal shield may have an interior surface defining passageway for turning the fluid flowing from the first flow passage through the passageway to the second flow passage.

The interior surface may include first and second segments normal to one another for directing fluid to the second flow passage at a right angle.

The interior surface of the thermal shield may be curved for a smooth turning of the fluid.

The valve seat may be supported in a nozzle retainer secured to the body and movable relative to the nozzle retainer.

The valve seat may be sealed to the nozzle retainer by a seal.

The nozzle retainer may be threadably connected to the body and sealed to the body by a seal.

The valve seat may be biased by a resilient member.

The valve seat may have an outer shoulder serving as a seat for one end of the resilient member and the nozzle retainer has an inner shoulder serving as a seat for another end of the resilient member.

According to still another aspect of the invention, a pressure regulator for regulating pressure in a compressed natural gas system is provided. The pressure regulator includes a body having an inlet, an outlet, an internal chamber, a first fluid passage between the inlet and the internal chamber, and a second fluid passage between the internal chamber and the outlet, a valve seat supported in the body for movement relative to the body for allowing the position of the valve seat to float relative to the body, a poppet movable relative to the valve seat from an open position to a closed position, and a thermal shield disposed within the internal chamber in the path of the fluid entering the internal chamber though the valve seat.

The thermal shield may be made of a material having a lower thermal conductivity than a material of the body for reducing heat transfer to the fluid flowing into the internal chamber from the body.

The valve seat may be resiliently biased downward in a first direction and movable upward in a second direction as a function of inlet pressure of fluid flowing through the first flow passage.

The valve seat may be movable in the second direction by increasing inlet pressure to reduce pressure drop of fluid flowing through a nozzle passageway downstream of the valve seat.

The foregoing and other features of the invention are hereinafter described in greater detail with reference to the accompanying drawings.

DETAILED DESCRIPTION

The principles of this present invention have particular application to pressure regulators for compressed natural gas powered vehicles, and thus will be described below chiefly in this context. It will of course be appreciated, and also understood, that principles of this invention may be applicable to other applications where it is desirable to regulate pressure.

Figure 2:
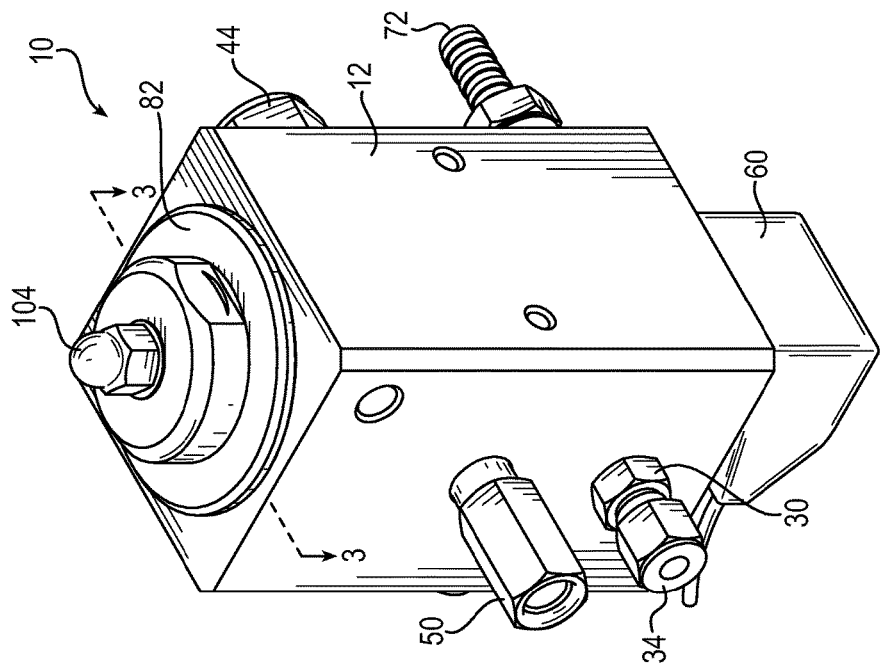
FIG. 2 is another perspective view of the pressure regulator.
Figure 1:
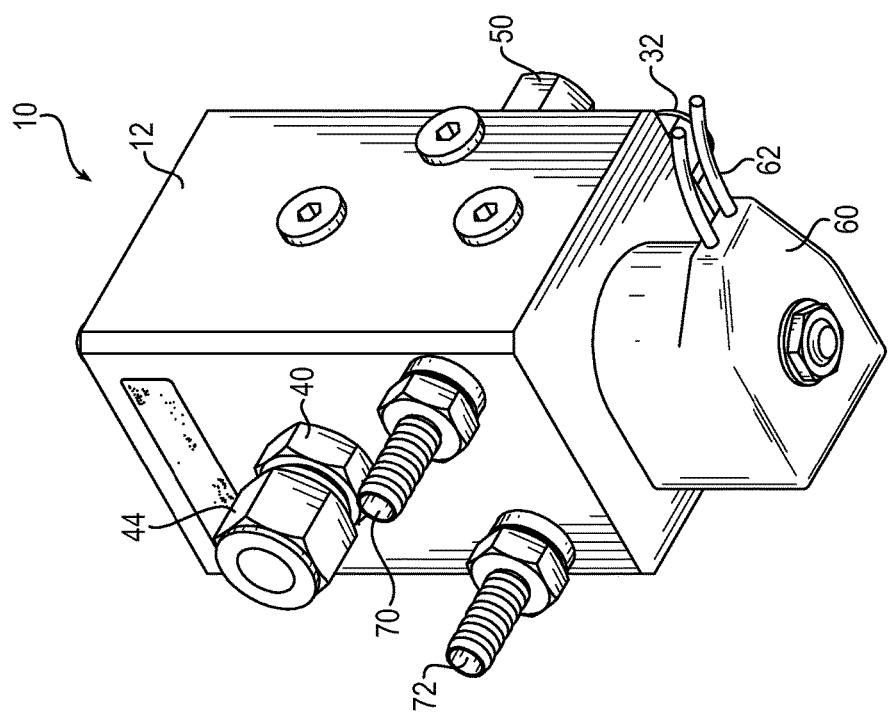
FIG. 1 is a perspective view of an exemplary pressure regulator according to the invention.
Figure 3:
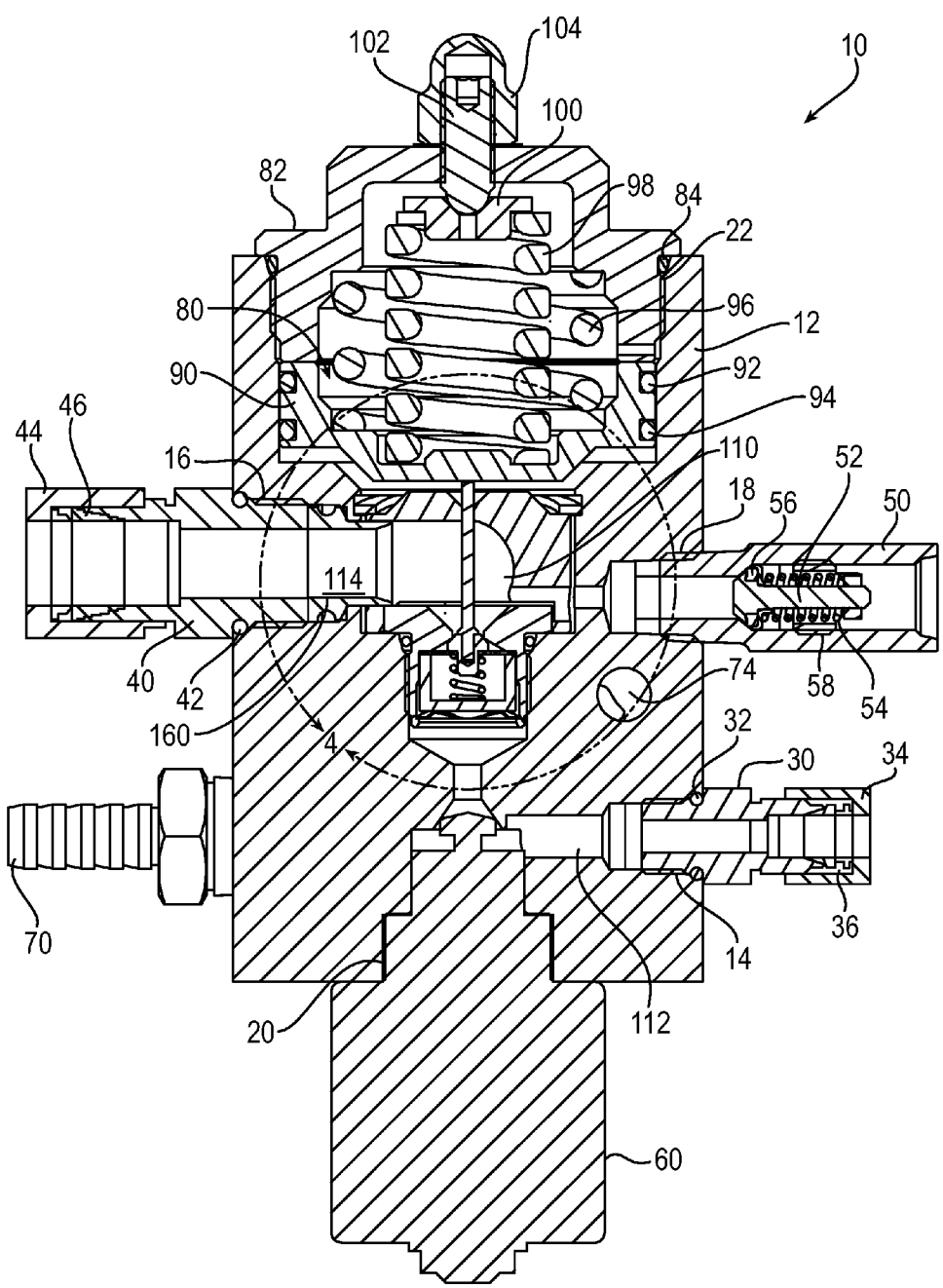
FIG. 3 is a cross-sectional view of the pressure regulator taken about line 3-3 in FIG. 2.

Referring to the drawings, and initially to FIGS. 1-3, a pressure regulator is illustrated generally at reference numeral 10. The pressure regulator 10 includes a body 12 having an inlet port 14, an outlet port 16, a relief port 18, a valve port 20, a piston port 22, and inlet and outlet heat exchanger ports (not shown). The inlet port 14 receives an inlet fitting 30, which is coupled to the inlet port 14 in any suitable manner, such as by a threaded connection, and which is sealed to the inlet port 14 in any suitable manner, such as by an o-ring 32. Coupled to the inlet fitting 30 is a compression fitting 34 configured to be coupled to a fluid conduit (not shown), and a ferrule 36 may be provided between the inlet fitting 30 and the compression fitting 34. Similar to the inlet port 14, the outlet port 16 receives an outlet fitting 40, which is coupled to the outlet port 16 in any suitable manner, such as by a threaded connection, and which is sealed to the outlet port 16 in any suitable manner, such as by an o-ring 42. Coupled to the outlet fitting 40 is a compression fitting 44 configured to be coupled to a fluid conduit (not shown), and a ferrule 46 may be provided between the outlet fitting 40 and the compression fitting 44.

The relief port 18 receives a relief valve 50, which may include a poppet 52 biased against an inner shoulder of the relief valve 50 by a resilient member 54 and sealed to the shoulder in any suitable manner, such as by o-ring 56. The poppet 52 and resilient member 54 may be retained in the relief valve 50 in any suitable manner, such as by a guide 58 that is secured in the relief valve, such as by a threaded connection. The valve port 20 may receive a suitable control valve, such as solenoid valve 60 having wires 62 for allowing/preventing fluid flow through the pressure regulator 10. In an embodiment, the solenoid valve 60 may be replaced by a suitable plug. The inlet and outlet heat exchanger ports each receive a suitable fitting 70, 72, respectively, which is coupled to a respective fluid conduit (not shown) for circulating engine coolant through the body 12, such as through passage 74 in the body 12, to draw heat from the engine coolant. While the engine coolant helps heat the body 12, the engine coolant generally does not flow until the engine has reached a predetermined temperature, and the circulation of the coolant may not prevent failure of elastomeric elements of the pressure regulator 10.

The piston port 22 receives a suitable piston assembly 80, which may be held in the body 12 in any suitable manner, such as by a cap 82 secured to the body 12 by a threaded connection and sealed to the body 12 in any suitable manner, such as by o-ring 84. The piston assembly 80 includes a piston 90 sealed to the body in any suitable manner, such as by o-rings 92 and 94. The piston 90 is biased in a first downward direction by one or more resilient members, such as first and second springs 96 and 98, and movable in a second upward direction opposite the first direction. The first spring 96 is seated on the piston 90 and the cap 82, and the second spring 98 is seated on the piston 90 and a spring button 100. The spring button 100 is held in position by a stem 102, which is secured to the body 12 in any suitable manner, such as a threaded connection. The stem 102 is movable relative to the body 12 to adjust the load of the spring 94, and may be adjusted in any suitable manner, such as by lock nut 104. It will be appreciated that in automobile applications, the load of the spring is generally preset.

Referring again to FIG. 3, the body 12 also includes an internal chamber 110 communicating with a side of the piston 90, a first fluid passage 112, a second fluid passage 114 and the relief valve 50. The first fluid passage 112 extends from the inlet port 14 to the internal chamber 110, and the second fluid passage 114 extends from the internal chamber 110 to the outlet port 16. Fluid, such as compressed natural gas, flows through the inlet fitting 30 to the first fluid passage 112, into the internal chamber 110, through the internal chamber 110 to the second fluid passage 114, through the second fluid passage 114 to the outlet fitting 40, and then to the engine.

Figure 4:
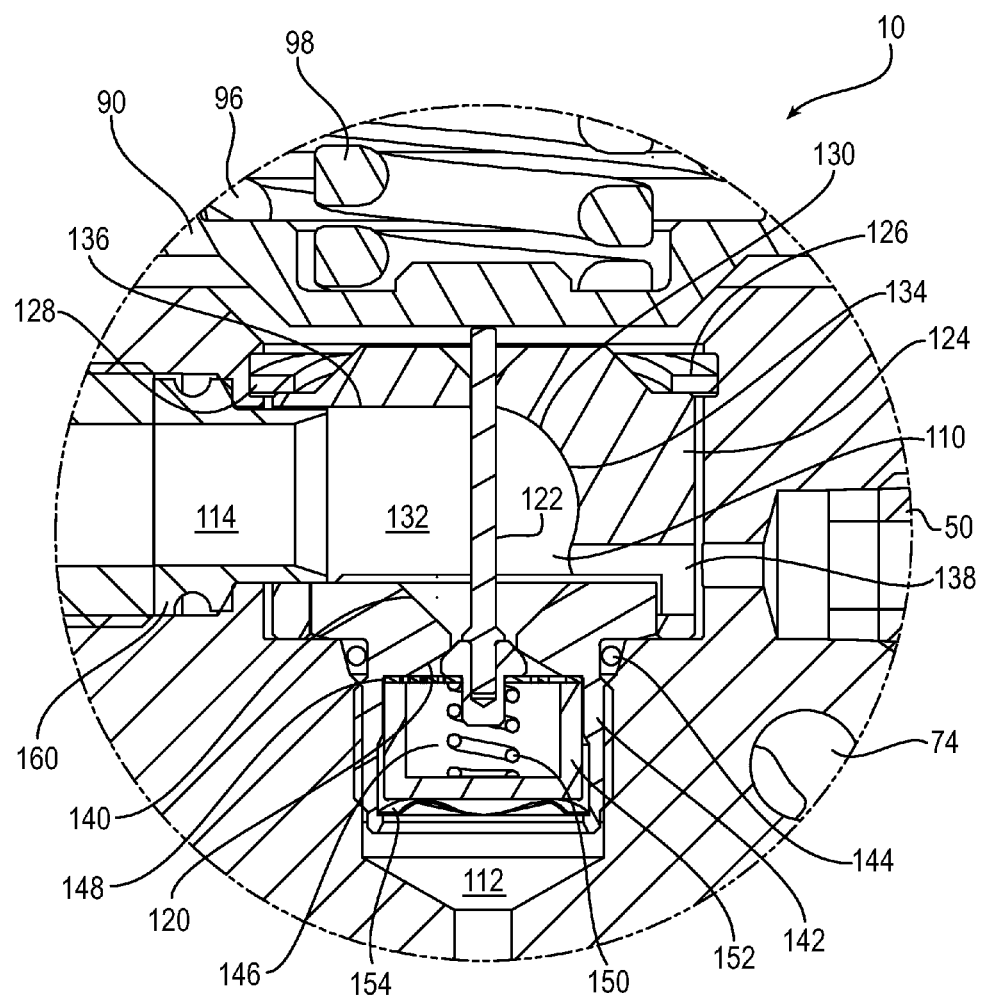
FIG. 4 is a cross-sectional view of detail 4-4 in FIG. 3.

Turning now to FIG. 4, the pressure regulator additionally includes a valve seat 120 surrounding the first fluid passage 112 upstream of the internal chamber 110, a poppet 122 movable relative to the valve seat from an open position to a closed position, and a thermal shield 124 disposed within the internal chamber 110. The thermal shield 124 surrounds the poppet 122 to axially guide the poppet in the first and second directions. The thermal shield has a bottom portion that abuts an inner wall of the body 12 that forms part of the internal chamber 110 to prevent the thermal shield from moving in the first direction, and a retainer 126, such as a spring loaded retainer ring, is secured in a groove 128 in the body 12 to prevent the thermal shield from moving in the second direction.

The thermal shield 124 is disposed within the internal chamber 110 in the path of the fluid entering the internal chamber 110 through the valve seat 120. The thermal shield is made of a material, such as polytetrafluoroethylene (PTFE), which has a lower thermal conductivity than a material of the body 12 for reducing heat transfer to the fluid flowing into the internal chamber 110 from the body 12. The thermal shield 124 also has a lower thermal conductivity than the piston 90 for reducing heat transfer to the fluid flowing into the internal chamber 110 from the piston 90. It will be appreciated that the thermal shield 124 may be made of any other suitable material having a low thermal conductivity and that is tolerant of the fluid, such as compressed natural gas.

By reducing heat transfer between the fluid and the body 12 and/or piston 90, the temperature of the components, and in particular the o-rings sealing the various components, is increased. While the fluid flowing through the pressure regulator 10 may drop in temperature, for example from around seventy degrees Fahrenheit to minus seventy degrees Fahrenheit, by reducing heat transfer the thermal shield 124 prevents failure of the elastomeric seals. Additionally, due to the reduced heat transfer between the fluid and the body 12 and/or piston 90, the density of the fluid is increased. Increasing the density improves the flow capacity of the pressure regulator 10, thereby allowing for higher flow rates at lower inlet pressures and increasing the travel capacity of the vehicle.

To assist in reducing heat transfer, the thermal shield 124 also has an interior surface 130 that is curved for a smooth turning of the fluid to quickly direct the fluid from the first flow passage 112 to the second flow passage 114. The curved interior surface 130 also reduces fluid impact against the thermal shield 124 to maintain the velocity of the fluid. The interior surface 130 defines at least a portion of a wall of a passageway 132 extending from the first flow passage 112 to the second flow passage 114. The wall includes first and second segments 134 and 136 that are normal to one another for directing fluid to the second flow passage 114 at a right angle, i.e., for directing fluid flowing in the second upward direction from the first flow passage 112 perpendicular to the second direction into the second flow passage 114. The thermal shield 124 also includes a passageway 138 from the passageway 132 to the relief valve 50 to allow excess pressure to exit the pressure regulator 10.

The pressure regulator 10 also includes a nozzle passageway 140 downstream of the valve seat 120 for directing fluid passing through the valve seat 120 into the internal chamber 110 that has been throttled. The nozzle passageway 140 may flare outward to substantially join the curved interior surface 130 for the fluid to expand as it flows through the nozzle passageway 140 into the internal chamber 110, and to create a smooth transition from the nozzle passageway 140 to the curved interior surface 130. The nozzle passageway 140 and the valve seat 120 may be formed by the body 12, or may be formed by a nozzle 142 in the body as shown.

The nozzle 142 may be coupled to the body 12 in the first flow passage 112 in any suitable manner, such as by a threaded connection, and sealed to the body 12 in any suitable manner, such as by o-ring 144. The nozzle 142 includes a cavity 146 upstream of the valve seat 120 that receives a poppet guide 148, a resilient member 150, and a suitable filter 152, such as a sintered filter, for filtering the fluid flowing through the first flow passage 112. The poppet guide 148 may be a flat spiral resilient element for moving up and down while resisting lateral motion to return the poppet 120 its position. The poppet guide 148 is trapped between an inner shoulder of the nozzle 142 and the filter 152, and has one side abutting the poppet 122 and another side seating one end of the resilient member 150. The other end of the resilient member 150 is seated on the filter 152. The filter 152, and therefore the poppet guide 148 and the resilient member 150, are secured in the cavity 146 by a suitable retainer 154, such as a spring loaded retainer ring. When the poppet 122 is biased in the open position by the piston 90, the resilient member 150 is compressed, and when the poppet 122 is moved to the closed position against the valve seat 120 by fluid pressure from the first flow passage 112, the resilient member 150 seats the poppet 122.

During operation of the pressure regulator 10, if no fluid is flowing through the regulator 10, the poppet 122 will be biased in the open position. When fluid is directed into the pressure regulator 10, for example when the solenoid 60 is opened, fluid flows through the first flow passage 112 into the internal cavity 110 and pressure builds under the piston 90. As the pressure builds, the poppet 122 is moved to the closed position. When a downstream valve is opened allowing the fluid to exit the pressure regulator 10, the fluid flows through the second flow passage 114 and out the outlet port 16, and the pressure under the piston drops allowing the poppet 122 to move toward the open position. The fluid flowing through the nozzle passageway 140 into the internal chamber 110 substantially flows along the curved interior surface 130 of the thermal shield 124 and exits the thermal shield 124 into a sleeve 160 to reduce heat transfer between the body 12 and the fluid. The fluid then flows through the sleeve 160 into and through the outlet fitting 40 and out of the pressure regulator 10.

Figure 5:
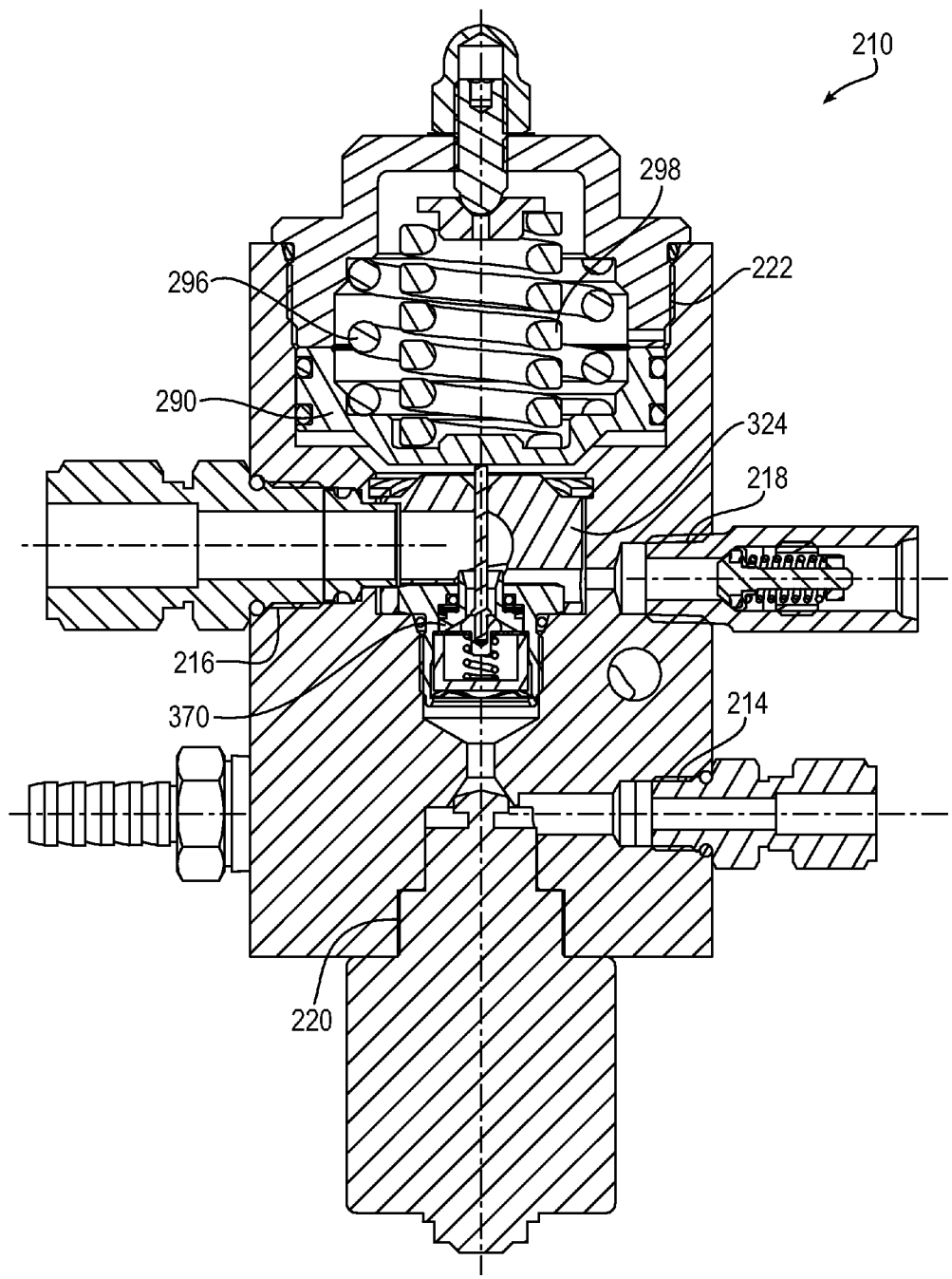
FIG. 5 is cross-sectional view of another exemplary pressure regulator according to the invention shown in an open position.
Figure 6:
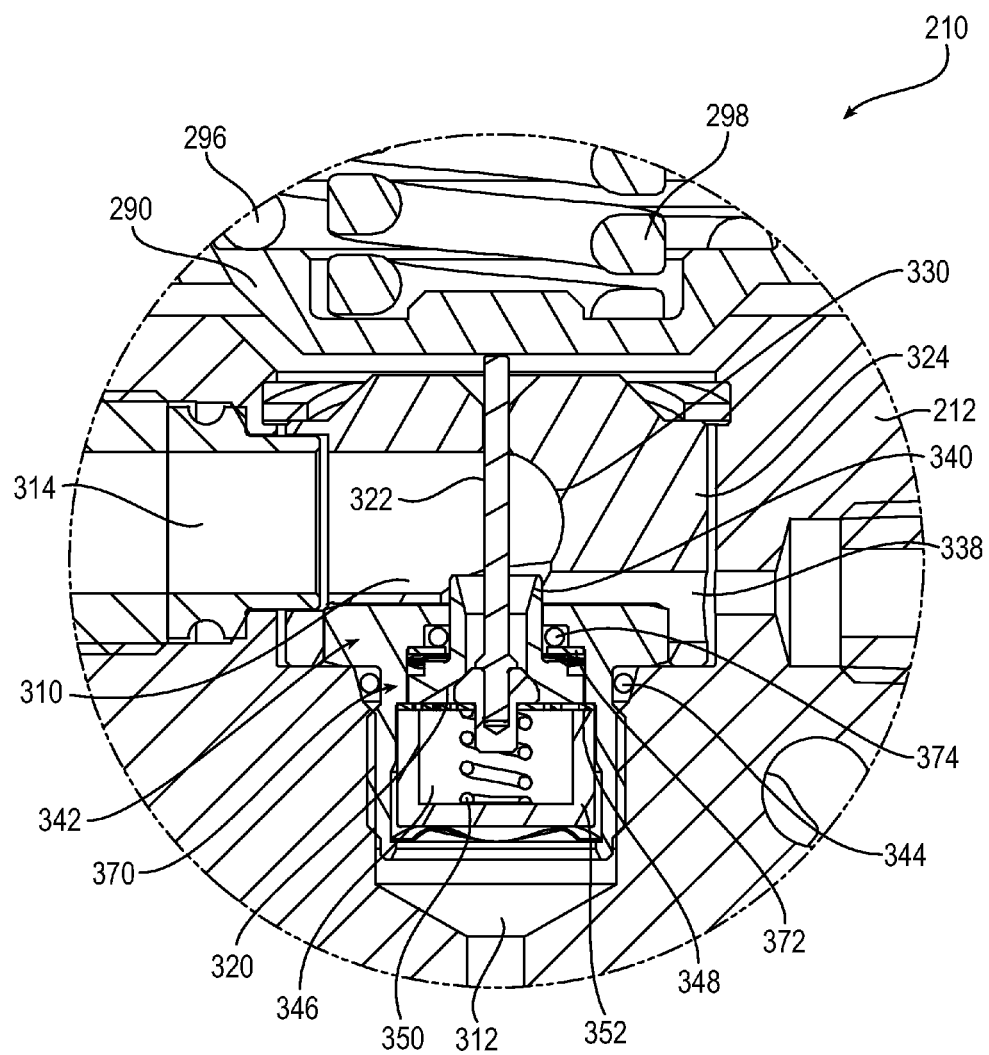
FIG. 6 is cross-sectional detail view of the pressure regulator of FIG. 5 shown in a closed position.

Turning now to FIGS. 5 and 6, an exemplary embodiment of the pressure regulator is shown at 210. The pressure regulator 210 is substantially the same as the above-referenced pressure regulator 10, and consequently the same reference numerals but indexed by 200 are used to denote structures corresponding to similar structures in the pressure regulators. In addition, the foregoing description of the pressure regulator 10 is equally applicable to the pressure regulator 210 except as noted below.

The pressure regulator 210 includes a body 212 having an inlet port 214, an outlet port 216, a relief port 218, a valve port 220, a piston port 222, and inlet and outlet heat exchanger ports (not shown). The piston port receives a piston 290 that is biased in a first downward direction by one or more resilient members, such as first and second springs 296 and 298, and movable in a second upward direction opposite the first direction. The body 212 also includes an internal chamber 310 communicating with a side of the piston 290, a first fluid passage 312, and a second fluid passage 314.

The pressure regulator 210 additionally includes a valve seat 320 surrounding the first fluid passage 312 upstream of the internal chamber 310, a poppet 322 movable relative to the valve seat 320 from an open position to a closed position, and a thermal shield 324 disposed within the internal chamber 310. The thermal shield 324 is disposed within the internal chamber 310 in the path of the fluid entering the internal chamber 310 through the valve seat 320. The thermal shield 324 is made of a suitable material, such as PTFE, that has a lower thermal conductivity than a material of the body 212 and/or the piston 290 for reducing heat transfer from the fluid flowing into the internal chamber 310 to the body 212 and/or piston 290. The thermal shield 324 also has an interior surface 330 that is curved for a smooth turning of the fluid to quickly direct the fluid from the first flow passage 312 to the second flow passage 314, and a passageway 338 to the relief valve to allow excess pressure to exit the pressure regulator 310.

The pressure regulator 210 also includes a nozzle passageway 340 downstream of the valve seat 320 for directing fluid passing through the valve seat 320 into the internal chamber 310 that has been throttled. The nozzle passageway 340 may flare outward to substantially join the curved interior surface 330 for the fluid to expand as it flows through the nozzle passageway 340 into the internal chamber 310 and to create a smooth transition from the nozzle passageway 340 to the curved interior surface 330. The nozzle passageway 340 and the valve seat 320 may be formed by a floating seat 370 in the body 312, which is supported in the body 312 for movement relative to the body 312 for allowing the position of the seat 370 to float relative to the body 312. The seat 370 is resiliently biased downward in the first direction and movable upward in the second direction as a function of inlet pressure of fluid flowing through the first flow passage 312. The seat 312 is resiliently biased downward by a resilient member, such as a wave spring 372, and supported in and sealed to a nozzle retainer 342 by a suitable seal, such as o-ring 374. The floating seat 370 has an outer shoulder serving as a seat for one end of the resilient member 372 and the nozzle retainer 342 has an inner shoulder serving as a seat for another end of the resilient member 372.

The nozzle retainer 342 may be coupled to the body 212 in the first flow passage 312 in any suitable manner, such as by a threaded connection, and sealed to the body 212 in any suitable manner, such as by o-ring 344. The nozzle retainer 342 includes a cavity 346 in which the floating seat 370 is supported and that receives a poppet guide 348, a resilient member 350, and a suitable filter 352.

At no or low inlet pressure, the resilient member 372 biases the floating seat 370 downward. As the inlet fluid pressure increases, the force acting on the seat 370 increases and the seat 370 is moved in the second direction to reduce pressure drop of fluid flowing through the nozzle passageway 340 downstream of the valve seat 320 and effect movement of the piston 290 in the second direction. The floating seat 370 thereby allows for the outlet pressure at high inlet pressure to be similar to the outlet pressure at low inlet pressure and high flow to reduce the pressure control envelope, thereby reducing size, weight, and cost of the pressure regulator and allowing for a larger poppet to be utilized. The pressure regulator 310 eliminates or reduces vehicle starting problems at maximum regulator outlet pressure and allows for increased horsepower to be delivered at the minimum outlet pressure.

As low pressure, high flow fluid exits the nozzle passageway 340 and flows into the thermal shield 324, gas molecules that surround the thermal shield 324 will become entrained in the high flow stream of fluid, resulting in a lower pressure region around the thermal shield 324. The thermal shield has an internal profile such that the fluid maintains its velocity without creating vortices that would entrain the gas. This venturi effect creates a low pressure region under the piston 290 so that the piston will move downward at higher flow rates to improve the flow curve of the pressure regulator 310. Thus, improvement in pressure drop at specific inlet pressures may be achieved without increasing the size of the pressure regulator.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A pressure regulator including:
a body having an inlet, an outlet, an internal chamber, a first fluid passage between the inlet and the internal chamber, and a second fluid passage between the internal chamber and the outlet;
a valve seat surrounding the first fluid passage upstream of the internal chamber;
a poppet movable relative to the valve seat from an open position to a closed position; and
a thermal shield disposed within the internal chamber in the path of the fluid entering the internal chamber through the valve seat, the thermal shield being made of a material having a lower thermal conductivity than a material of the body for reducing heat transfer between the fluid flowing into the internal chamber and the body.

2. The pressure regulator according to claim 1, further including a piston biasing the poppet in the open position.

3. The pressure regulator according to claim 2, wherein the piston is biased in a first axial direction towards the valve seat by one or more resilient members and movable in a second axial direction opposite the first direction by fluid acting on the piston.

4. The pressure regulator according to claim 2, wherein the piston is sealed to the valve body by one or more seals.

5. The pressure regulator according to claim 2, wherein the thermal shield has a lower thermal conductivity than the piston for reducing heat transfer from the fluid flowing into the internal chamber to the piston.

6. The pressure regulator according to claim 1, wherein the thermal shield is made from polytetrafluoroethylene.

7. The pressure regulator according to claim 1, wherein the thermal shield surrounds the poppet to axially guide the poppet.

8. The pressure regulator according to claim 1, further including a nozzle passageway downstream of the valve seat for directing fluid passing through the valve seat into the internal chamber.

9. The pressure regulator according to claim 8, wherein the nozzle passageway flares outward.

10. The pressure regulator according to claim 8, wherein the nozzle passageway and the valve seat are integrally formed.

11. The pressure regulator according to claim 1, wherein the body further includes a relief port in fluidic communication with the internal chamber for receiving a relief valve.

12. The pressure regulator according to claim 1, wherein the thermal shield has an interior surface defining at least a portion of a wall of a passageway extending from the first flow passage to the second flow passage.

13. The pressure regulator according to claim 12, wherein the wall includes first and second segments normal to one another for directing fluid to the second flow passage at a right angle.

14. The pressure regulator according to claim 12, wherein the interior surface of the thermal shield is curved for a smooth turning of the fluid.

15. The pressure regulator according to claim 1, wherein the valve seat is supported in the body for movement relative to the body for allowing the position of the valve seat to float relative to the body.

16. The pressure regulator according to claim 15, wherein the valve seat is resiliently biased downward in the first axial direction and movable upward in the second axial direction as a function of inlet pressure of fluid flowing through the first flow passage.

17. The pressure regulator according to claim 16, wherein the valve seat is movable in the second direction by increasing inlet pressure.

18. A pressure regulator for regulating pressure in a compressed natural gas system, the pressure regulator including:
　a body having an inlet, an outlet, an internal chamber, a first fluid passage between the inlet and the internal chamber, and a second fluid passage between the internal chamber and the outlet;
　a valve seat supported in the body for movement relative to the body for allowing the position of the valve seat to float relative to the body;
　a poppet movable relative to the valve seat from an open position to a closed position; and
　a thermal shield disposed within the internal chamber in the path of the fluid entering the internal chamber through the valve seat.

19. The pressure regulator according to claim 18, wherein the thermal shield is made of a material having a lower thermal conductivity than a material of the body for reducing heat transfer from the fluid flowing into the internal chamber to the body.

20. The pressure regulator according to claim 18, wherein the valve seat is resiliently biased downward in a first direction and movable upward in a second direction as a function of inlet pressure of fluid flowing through the first flow passage.

21. The pressure regulator according to claim 20, wherein the valve seat is movable in the second direction by increasing inlet pressure to reduce pressure drop of fluid flowing through a nozzle passageway downstream of the valve seat.

* * * * *